US006625464B1

(12) United States Patent
Bandy et al.

(10) Patent No.: US 6,625,464 B1
(45) Date of Patent: Sep. 23, 2003

(54) CODEABLE PROGRAMMABLE RECEIVER AND POINT TO MULTIPOINT MESSAGING SYSTEM

(75) Inventors: Marshall M. Bandy, Ringgold, GA (US); Joseph E. Lowe, Ringgold, GA (US)

(73) Assignee: Data FM, Incorporated, Ringgold, GA (US)

(*) Notice: Subject to any disclaimer, the term of this patent is extended or adjusted under 35 U.S.C. 154(b) by 0 days.

(21) Appl. No.: 09/342,411

(22) Filed: Jun. 29, 1999

Related U.S. Application Data

(60) Provisional application No. 60/096,408, filed on Aug. 13, 1998.

(51) Int. Cl.[7] .......................... H04B 15/00; H04B 7/005

(52) U.S. Cl. .......................... 455/503; 455/45; 455/132; 455/3.02; 340/7.26

(58) Field of Search ................................ 455/426, 404, 455/458, 500, 502, 503, 518, 529, 521, 132, 566, 158.5, 161.1, 205; 340/7.1, 7.2, 7.21, 7.25, 7.28, 7.29, 7.39, 7.4, 7.41, 7.43, 7.46, 7.47, 7.48, 7.5, 7.51, 7.52

(56) References Cited

U.S. PATENT DOCUMENTS 5,045,848 A * 9/1991 Fascenda .................. 340/7.41
5,241,305 A * 8/1993 Fascenda et al. .......... 340/7.41
5,293,484 A * 3/1994 Dabbs, III et al. .............. 705/1
5,438,327 A * 8/1995 Toriya et al. .......... 340/825.52
5,515,372 A * 5/1996 Porter ........................ 370/312
5,745,503 A * 4/1998 Kuusinen .................... 714/752
5,790,958 A * 8/1998 McCoy et al. .............. 455/557
5,794,164 A * 8/1998 Beckert et al. ............. 455/456
5,870,030 A * 2/1999 DeLuca et al. ............ 340/7.48
5,960,325 A * 9/1999 Graham ..................... 340/7.46
5,991,374 A * 11/1999 Hazenfield ............ 379/101.01
6,021,433 A * 2/2000 Payne et al. ................ 709/219
6,108,539 A * 8/2000 Ray et al. .................... 455/430
6,157,814 A * 12/2000 Hymel ....................... 340/7.2
6,226,495 B1 * 5/2001 Neustein ..................... 455/406
6,275,477 B1 * 8/2001 Trompower et al. ........ 370/313

* cited by examiner

*Primary Examiner*—Edward F. Urban
*Assistant Examiner*—Temica M. Davis
(74) *Attorney, Agent, or Firm*—Miller & Martin LLP

(57) ABSTRACT

A point to multipoint messaging system includes utilizing the FM 57 kHz Radio Broadcast Data System (RBDS) standard and a novel receiver. A single broadcast source sends messages from multiple senders, in a variety of manners including automatically and semi-automatically, to a plurality of receivers who may select to receive or not to receive particular senders' messages. The receiver is remotely programmable by the user so that the user may select to receive at least some messages.

42 Claims, 4 Drawing Sheets

CODEABLE PROGRAMMABLE RECEIVER AND POINT TO MULTIPOINT MESSAGING SYSTEM

This application claims the benefit of U.S. Provisional Application No. 60/096,408 filed Aug. 13, 1998.

FIELD OF THE INVENTION

The present invention relates to a point to multipoint messaging system preferably utilizing the FM 57 khz Radio Broadcast Data System (RBDS) standard and a novel receiver. In general terms, the present invention utilizes a single source to send messages from multiple senders to a plurality of receivers who may select to receive or not receive that particular sender's message.

BACKGROUND OF THE INVENTION

Ever since man has congregated in groups, certain individuals have banded together for one reason or another. Today individuals are often participants in numerous groups.

Such groups include a single community, such as a town. Another group could be the members of a particular church. Another example could be all the employees at a particular business. Another group could be all of the customers of a particular grocery store. Another group could be the parents whose children are all in the same school. On a national political level, there are two rather large groups, the Republican Party and the Democratic Party. This is by no means an all inclusive list. Most people are associated with several such groups in their daily course of dealings.

These groups also have leaders and/or members which disseminate information. In the early days of society's development, disseminators would gather members of the group together to promulgate information. This could occur at a regular interval or in times of specific need. A similar need exists in today's groups, however, today's groups are more diverse and dispersed. Disseminators, such as political electees, priests or preachers, store owners, chief executive officers, and even the leadership of the parent teachers association of any given school often find themselves in need of conveying information to members of a particular group. Other people may also require or desire communication with members of specific groups at various times and for many reasons. All of these disseminators need an effective means of scheduling point (disseminator) to multi-point (group) communication.

The current methods of achieving rapid point to multipoint messaging suffers from a variety of shortcomings. For instance, point to multipoint messaging may be achieved utilizing a list serve program over e-mail systems. However, this requires the recipients of messages to have access to their computer to regularly check messages for efficient dissemination of information and each recipient is individually addressed. Most current paging devices simply permit the reception of point to point messaging and are more suitable for private communications. The paging devises that do permit multi point broadcast are not designed to be user programable. Chain telephone calling is slow and labor intensive, while broadcast medias such as radio and television provide no method for recipients to filter unwanted messages.

Many types of paging software are known in the art. One paging system utilizes the computer software Basepage(tm). This off-the-shelf program can be utilized by a paging service to allow a user to input information in a standard protocol known as TAP. The information is sent to a processing station where it is transmitted. A specific pager having a specific pre-programmed CAPCODE receives this information. Some receivers, including pagers, have been developed to search FM frequencies for a particular PI code as taught in U.S. Pat. Nos. 5,346,607; 5,345,606 and 5,345,605.

Some paging systems have also been formulated which allow a person having a pager to receive such information as sports scores. These pagers receive this sports information, but the known pagers are not user programmable to select or deselect to receive this information. Instead, the pager is programed by the service provider before being delivered to the user to receive this information. These prior art pagers do not allow the user to choose which information is received once a particular pager is selected, without vendor service. Furthermore, these pagers do not allow the user to choose to select from or deselect other sources to receive information either.

At least one pager company is known to offer a particular pager to be programmed with up to eight CAPCODES. However, this pager must be reprogrammed by the paging company to change any or all of the CAPCODES. These CAPCODES are not user selectable.

U.S. Pat. No. 5,121,430 discloses a storm alert system for emergencies which utilizes TV frequencies, encrypted information and codes based upon geographic locations. This system requires TV's which are potentially more expensive than radios and the selection of identification codes is tied to geographic locations instead of people or groups. Furthermore, as a particular TV would be located in a single location, the switch settings would allow a user to program to receive only for a single location.

Accordingly, it is a purpose of the present invention to provide a method of facilitating point to multipoint messaging and a novel receiving device utilized in this system. A need also exists to provide disaster alerts to members of a community, groups or to individuals. Such disaster information may include information on tornados, storms, floods, fires, hazardous material, or power outages and the like. Other information may be particularly important to a given community as well. Information including election day results, deaths in the community or births may be information that a particular community would want rapid information to be distributed about.

Another purpose of the present invention is to provide a method of advertising.

Another object of the invention is to utilize an existing subcarrier of an FM radio station. As a practical point, many subcarriers, if not the majority of subcarriers, are not utilized. Accordingly, the present invention provides a use for these currently dormant subcarriers.

Another object of the invention is to allow a user to program a receiver to receive messages from any sender. The consumer can select from many senders from which to receive messages. Another object is to allow members of a particular group to receive messages at the same time when the message is sent only once by the sender. This will likely result in a saving of time and money when attempting to quickly and economically communicate with members of a group. A group leader, or disseminator, can send messages instantly and only once knowing that every member of the group has received it.

Another purpose of the present invention is to provide for communication to members on a local, statewide and national forum according to the needs of the particular group which seeks to distribute information to its members.

Additional objects and advantages of the invention will be set forth in part in the following description, or may be obvious from the description or accompanying drawings, or may be learned to practice the invention.

SUMMARY OF THE INVENTION

The communication method and system utilized herein is a new method of communication. To utilize this method and system, first information is sent from a disseminator to a data receiver. The data receiver may, or may not, convert the format of this information prior to sending the information to a processing station. Information leaving the processing station is converted to an acceptable format to be transmitted to a radio transmitter. A signal generator will likely be required to convert information into an acceptable format for transmission by a radio transmitter. The radio transmitter transmits the information, preferably on a subcarrier of an FM (frequency modulated) radio station. The information is coded with a particular identification code, known as a CAPCODE. This CAPCODE may be attached at any location prior to transmission of the information. The transmission may also be coded with another type or identification code known as a PI code. Furthermore, the transmission may be coded with both a CAPCODE, a PI code and/or any other identification code. A programmable receiver receives the information from the radio transmitter provided that the receiver is programmed to receive that particular identification code, i.e., such as a CAPCODE. This completes the process of getting information from a disseminator to a group member.

One giant difference between this technology and prior paging technology is the ability to allow a consumer to program a receiver to receive messages from a sender. Additionally, the consumer can select multiple senders from which to receive messages. Also, many users can receive a single message sent from one sender at the same time. A person, such as the leader of any group, can send a message once, and know that this message has been sent to every member of the group. In a preferred form, the radio transmitter utilizes an existing FM subcarrier. This will allow for immediate implementation worldwide without further investment and infrastructure. Since many, if not most, subcarriers are not utilized, this communication system is a pioneer development in point to multipoint communication systems.

Additionally, CAPCODES under this system may be assigned to groups as well as individuals. There is no known system in place for multiple users to select a single CAPCODE to receive the same information without vendor service.

Figure 1:
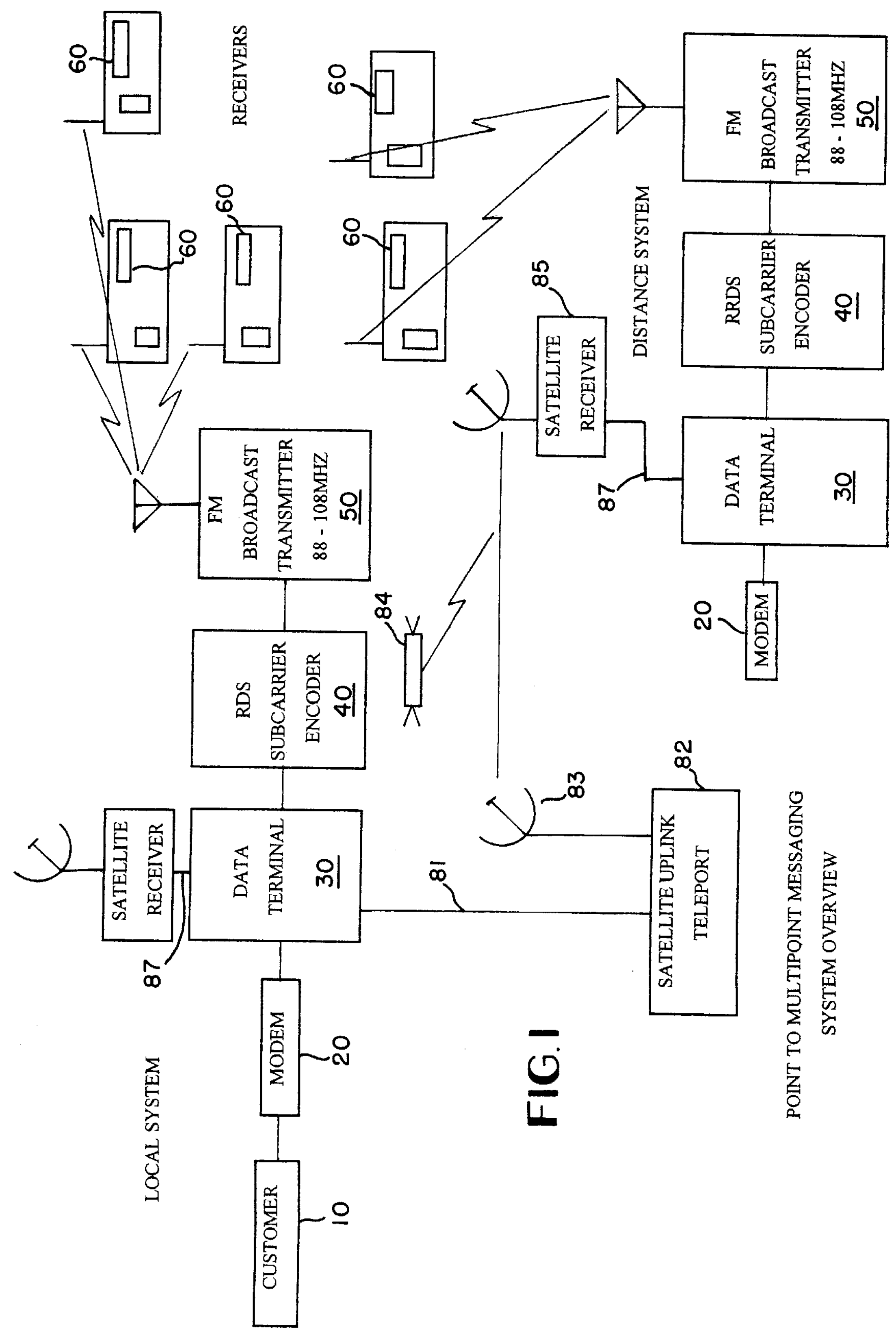
FIG. 1 shows an overview of the operation of the point to multipoint messaging system according to the present invention.

Repeat use of reference numerals in the present specification represents like, similar or analogous parts, features or elements of the present invention throughout several views.

DETAILED DESCRIPTION OF THE DRAWINGS

Reference will now be made and detailed to the presently preferred embodiments of the invention, one or more examples of which are illustrated in the accompanying drawings, FIGS. 1–4. Each example is provided by way of explanation of the invention, not limitation of the invention. In fact, it will be apparent to those skilled in the art that modifications and variations can be made in the present invention without departing from the scope or spirit thereof. For instance, features illustrated as described as part of one embodiment may be used on another embodiment to yield still a further embodiment. Thus, it is intended that the present invention cover such modifications and variations as comes under the scope of the appended claims and their equivalents.

The present invention provides a system of point to multi-point communication. Additionally, a method of inputting selectable codes denominated CAPCODES into an FM radio programmable receiver designed for receiving messages from data broadcast from an FM radio station is taught. This method with the appropriately designed receiver allows for point to multipoint reception to individuals who select to receive messages from information generators or disseminators. The information generators will typically be business owners, business managers, civic organizations, and other persons needing to communicate immediately to a plurality of individuals at diverse locations. The present system permits the message recipients to determine the information generators from which he desires to receive messages.

FIG. 1 is an overview of the presently preferred embodiment. The preferred embodiment starts with a message which will typically originate from an information generator 10, such as a customer, by an e-mail from a data transmitter 20, such as a modem personal computer or other message transmission device, including but not limited to touch-tone telephones. The customer will preferably send this message over a standard telephone network to a processing station 30 that receives the message and translates the message into an acceptable format for radio transmission. The processing station 30, shown as a data terminal, receives the message and sends it to a signal generator 40, the RBDS subcarrier encoder. From the signal generator 40, the message goes to the radio transmitter 50, shown as FM Broadcast Transmitter (88–108 Mhz).

In the preferred embodiment, the signal generator 40 utilizes an SC100 developed by CRL System of Tempe, Ariz. and manufactured by Cirkisys Technology, Ltd., for formatting the message for input into a data stream in an RBDS 57 khz subcarrier generator of an FM radio station. The FM station transmitter system receives the 57 khz signal and carries it within its broadcast on a subcarrier to its broadcast area as it transmits its primary signal. An RBDS receiver, such as the modified FM radio receiver illustrated in FIGS. 1, 2 and 4, then receives the RBDS data and divides the signal into the RBDS standard packets. The receiver is a user-programmable receiver 60. If a message is transmitted having a particular CAPCODE which has been selected by the user of the receiver, the receiver filters and stores this message for either immediate use displays or recall by a user. Of course, it will be obvious to one skilled in the art that the data need not be sent according to the RBDS standard. The RDS standards is a similar, but different, standard utilized in Europe. Other data formats may also be utilized.

An alternative embodiment, also illustrated in FIG. 1, shows conductor 81 linking the processing station 30 to a satellite uplink 82. The satellite uplink 82 sends information to a satellite uplink transmitter 83 which transmits information to satellite 84. From the satellite 84, information is transmitted back to a second system to a satellite receiver 85. From the satellite receiver 85, the information is conducted through down link conductor 87 to a second processing station 30. Although the uplink conductor 81 is shown receiving information from the processing station 30, information could also be received directly from the information generator 10, the data receiver 20, the signal generator 40 or the radio transmitter 50. Additionally, the downlink conductor 87 could send information to the data receiver 20 signal generator 40 or the radio transmitter 50. Furthermore, instead of utilizing a satellite uplink/downlink system, any other wide web network system could be utilized by including telephone lines or others.

Figure 2:
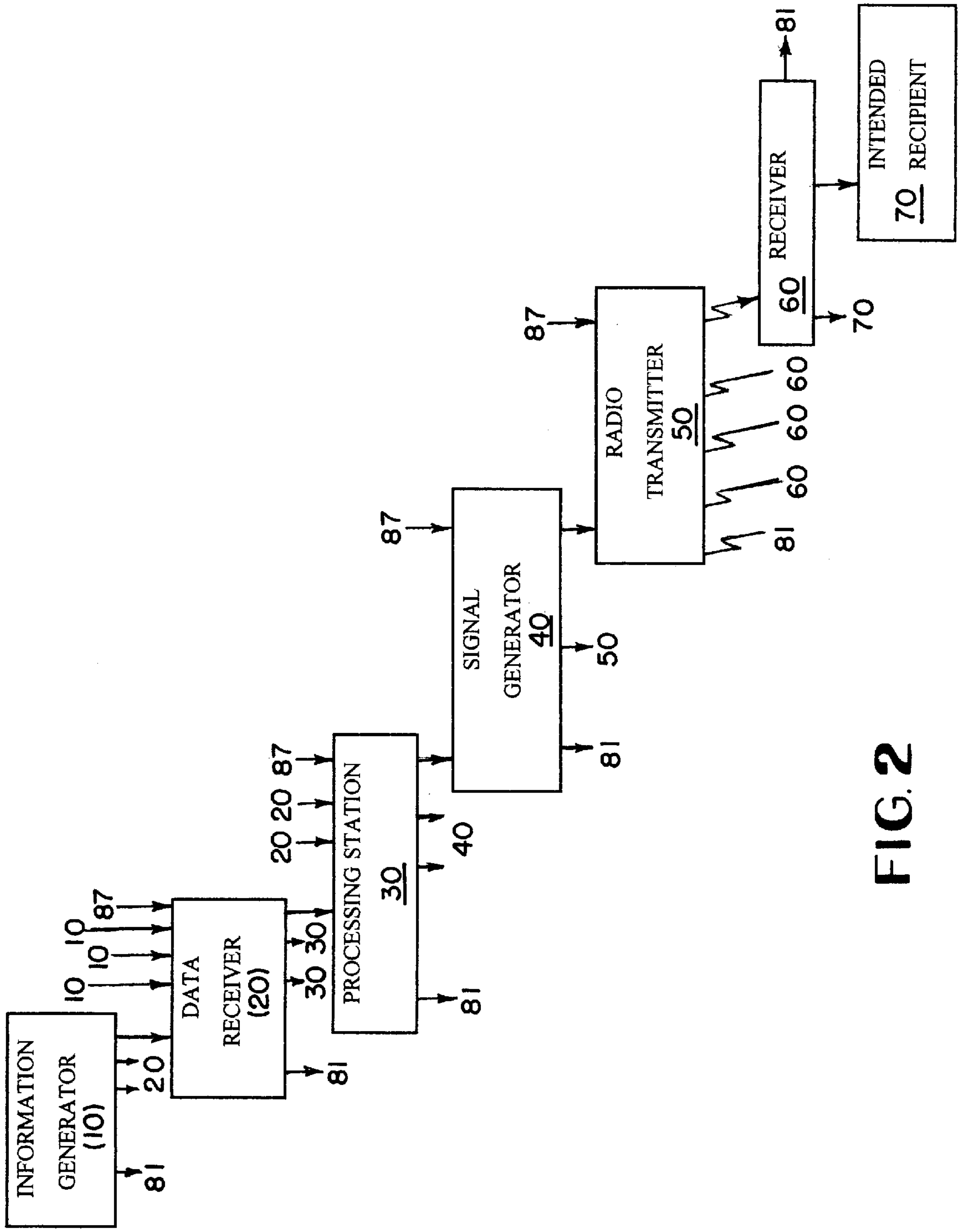
FIG. 2 is a schematic of the system of FIG. 1 in more detail.

Turning to FIG. 2, a message will typically originate from an information generator 10. An information generator could be any individual desiring to communicate with multiple locations. Alternatively, an information generator could be an automatic device producing an information stream which is to be received at multiple locations (such as an automatic fire alarm sending a signal that would be received by fire stations and firemen.)

Next, the information generator 10 will submit information, perhaps in the form of a message to at least one data transmitter 20. The transmitter 20 could be a personal computer having a modem or other message origination device, including but not limited to, a touch tone telephone. The data receiver, the customer, or information generator 10 will send or conduct this message through the data transmitter 20 to at least one processing station 30. In a preferred embodiment, the data transmitter 20 is a computer equipped with Basepage(tm) software which is a common paging software. This software allows a user to input a message. The message is assigned a CAPCODE based upon the individual or group to which the message is to be sent. In the paging industry, the telephone number of the recipient's pager will often at least partially correspond to the CAPCODE which is entered. In this messaging system, an information code, or identification code, will be assigned to the information generator's message which corresponds either to a particular sender or to a particular group. A portion of a telephone number for a person or group may also be utilized as the CAPCODE for this system.

The Basepage(tm) software converts message information into a TAP protocol. This information is then sent to the processing station 30. This system envisions multiple information generators 10 data transmitter 20 and user-programmable receivers 60. Depending on the particular configuration of the system utilized, there may also be multiple processing stations 30, multiple signal generators 40, and multiple radio transmitters 50 utilized.

The data transmitter 20 need not necessarily convert data into a specific protocol. Instead, the data transmitter 20 may act simply as a conduit from the information generator 10 to the processing station 30. If the data transmitter 20 does not assign an identification code to the information from the sender, then the processing station 30 must assign this code.

In a preferred embodiment the processing station 30 is a part of the signal generator 40. This processing station 30 may, or may not, translate the messages received from the data transmitter 20 from one format to another type format. From the processing station 30 the message will be sent to and processed by a signal generator 40 which formats the message for input into a data stream to be transmitted by a radio transmitter 50. The processing station 30 may, or may not, be a part of the same device which has the signal generator 40. In a presently preferred embodiment, the signal generator 40 is the SC 100. This particular signal generator 40 incorporates the processing station 30 which receives information from data transmitter 20. In a most preferred embodiment, the data stream will be in a RBDS format and located on a 57 khz subcarrier generator of an FM radio station. The SC 100 receives TAP protocol information and converts it to TNPP data out in RBDS protocol in the preferred embodiment. If a format other than FM radio broadcast is utilized, other signal generator types may be necessary. Additionally other signal generators 40 may be utilized with FM radio transmission.

From the signal generator 40, the message will be conducted to the radio transmitter 50 for broadcasting. Typically a radio station would broadcast via microwave which would then be transmitted to a radio tower where it would then be transmitted to a radio receiver. Anyone with a receiver adapted to receive these types of messages could then receive the broadcast. The TNPP data is digital in nature and not audible on many traditional radio receivers. Other data formats could function differently. Additionally, the radio transmitter 50 need not be an FM radio transmitter. Other frequencies including standard, or non standard AM, microwave or other frequencies could be transmitted by the radio transmitter 50.

The signal generator 40 is typically installed at the transmitter broadcast studio of a radio station. However, its physical location may, or may not, be at the radio station. Although the RBDS standard is utilized in America, other standards could also be utilized, including the EPP standard (European Paging Protocol standard) and/or RDS standard which is also utilized in Europe. Other protocols could also be used with this system as well.

The RBDS standard utilizes identification numbers in the form of PI (program identification) code. The PI code is a hexadecimal representation. Many radio stations utilize a PI code to identify the call letters of a particular radio station. For instance, the radio station WABC could have the hexadecimal representation of 54C4. Under the EPP standard, Group 13(*a*) is believed to identify the operator code of the receiver (system) or local radio station. At least three national networks utilize the EPP standard and have Group 13(*a*) operator codes. The communication system described herein is completely adaptable to the EPP standard, and is likely adaptable to any other standard as well, however, for ease of explanation, the system utilizing the RBDS standard will be discussed. Furthermore, the RBDS standard is currently the standard utilized in the United States. Other standards could be adopted in the future, and there is no reason a similar system could not be utilized with another standard.

The RBDS standard is described in great detail on the RDS organization website at *http://www.rds.org.tk/rds98/rds98.htm.* There are two publications available on this website which have been sponsored by the National Association of Broadcasters (NAB) and Electronic Industries Association (EIA). These documents describe the RBDS standard as well as the difference between the RBDS standard and the RDS standard. The RBDS standard utilizes 16 groups of information groups 0 to 15. For each group, two "versions" can be defined. Within the two versions of each group, there can be two blocks, so that there are four blocks per group.

The audio standard Group 7 data is monitored by the paging industry. Other groups, such as 8 and 11, could also be monitored. Group 0 is typically only the PI code. Other groups may include a PI code as well as other information. Presently, the FCC does not regulate the use of certain PI codes. There are 16 groups in the RBDS standard and very few of them are monitored by any receiver, primarily only Group 0, 1, 2 and Group 7. Depending on particular software configuration, any of these 16 groups could be utilized to convey information and/or information codes. Utilizing a single PI code approximately 1,000,000 CAPCODES can be utilized. If the PI code is changed and a receiver is made PI programmable, billions of CAPCODE/PI code combinations could be utilized.

Some radio receivers have been adapted to be able to search PI codes or operator codes transmitted by radio stations. Furthermore, some radio receivers have been adapted to be able to display the PI code when it begins with a W or a K. Accordingly, these radio receivers would display the call letters of the radio station on a display area. In the United States, the Federal Communications Commission (FCC) currently requires call letters of a radio station to begin with a W or with a K. Instead of using a W or a K in the PI code, the system of communication described herein utilizes any other letter or number as the first letter of the PI code. These specially adapted radio receivers which search for call letters of radio stations, would filter out these PI codes which do not begin with W or K and discard this information. The user-programmable receivers of this communication system are either pre-programed or programmed by user to search for a specific PI code. The PI Code "EEEE" has been chosen, but any other PI codes which do not begin with W or K could be utilized.

The signal generator 40, in the presently preferred embodiment, will generate a 57 khz signal in the RBDS format which will be placed on a subcarrier of a radio station. This signal will have a PI code of EEEE in the presently preferred embodiment. As the signal of the radio station is amplified, the subcarrier signal will also be amplified and transmitted to a listening area. In the United States, the FM broadcast range is from about 88 khz to about 108 Mhz. The FCC assigns a particular broadcast band to a radio station. Typically, the center of this band is the primary carrier of that radio station. In order to prevent interference from nearby radio transmitters, the FCC promulgates guidelines for the power and location along the FM frequency band of a particular radio station's primary carrier. In order to transmit over the audible range, a transmitter typically fluctuates from the primary carrier of plus or minus 75 khz for the audible range. Accordingly, within the band prescribed by the FCC, there are a number of subcarriers which could be utilized by that radio station, especially for non-audibly transmitted information.

The user-programmable receivers 60 of the present system and communication method are preferably adapted to search for a particular PI code, without necessitating the specification of a particular frequency. Typically, radio receivers of today are set to a particular frequency in order to receive the broadcast of that particular radio station. The user-programmable receivers 60 of the present system and method may, or may not, be frequency specific. In a preferred embodiment, a PI code such as EEEE is transmitted at a specific frequency which happens to be a subcarrier of a particular radio station. A user-programmable receiver 60 searches for a particular PI code. When that PI code is located, the information can then be further processed.

Figure 3:
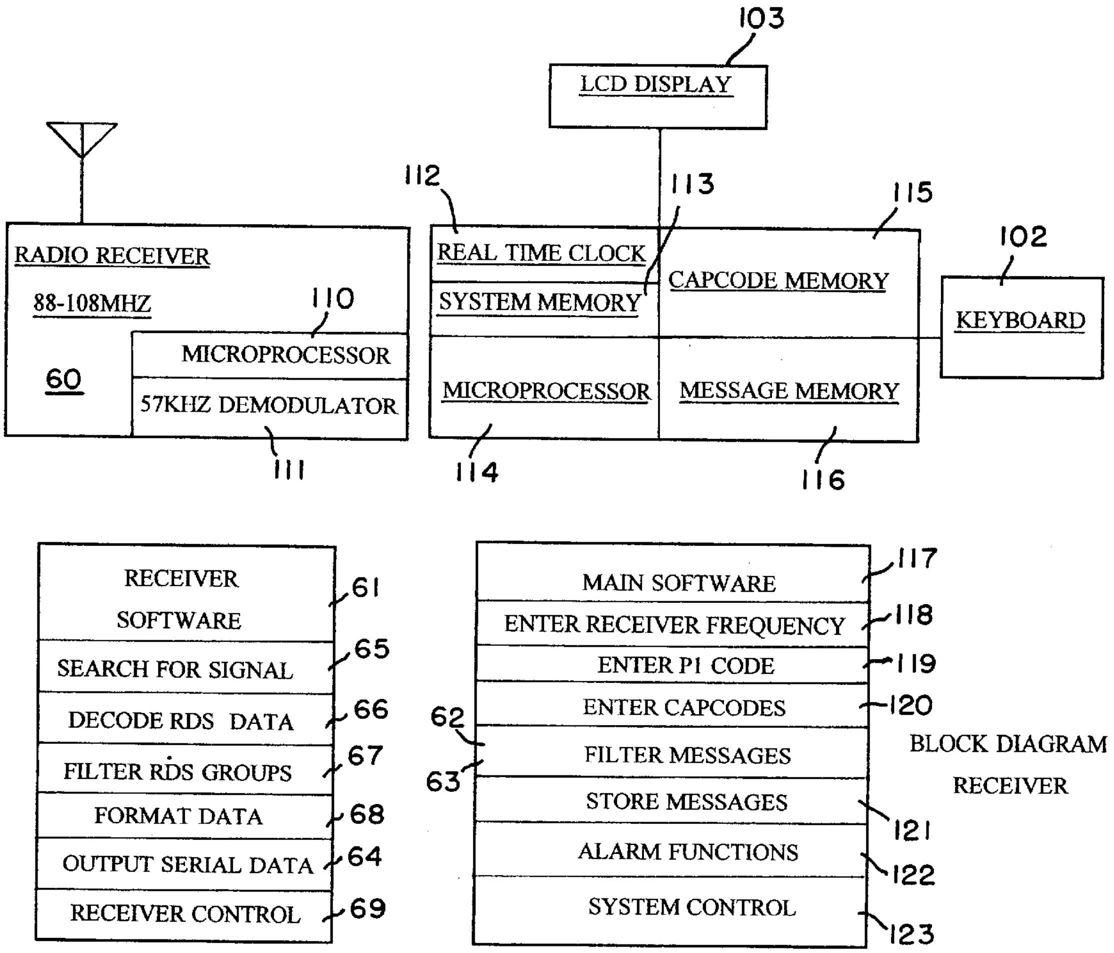
FIG. 3 provides a systematic representation of a receiver utilized with the preferred system.

The users of the receivers shown in FIG. 3 are able to enter the CAPCODE assigned to the information generators 10 whose messages they wish to receive. The receiver 60 sorts and decodes from all groups and codes broadcast having the correct PI code. Messages are then filtered according to whether they have an information code which corresponds to any of the CAPCODES programmed into the receiver 60 by the receiver owner or any pre-programmed CAPCODE. This precoding can be done by entering a CAPCODE or addressing code via a keypad incorporated with the receiver. Other methods of entering a CAPCODE could also be utilized such as selection with a touch screen or serial interface such as an RS232 port on a personal computer. The receiver then allows the decoded messages to be displayed on a display, such as an LCD screen, pager or radio, or in commercial applications on billboards or road signs, or any other device designed to display electronic messages or audibly by text-to-voice conversion.

More specifically, FIG. 3 illustrates the inner workings of the user-programmable receiver 60. The particular receiver 60 shown is a typical FM receiver which would normally receive radio broadcasts between 88 and 108 Mhz. The receiver 60 will have a microprocessor 110 and a 57 Khz demodulator 111. As information is received by the radio receiver 60 the demodulator 111 and microprocessor 110 will work together to demodulate the information received by the receiver 60. Receiver software 61 will first search for a signal 65. Next, the RBDS data will be decoded 66. Next, the receiver 60 will filter the RBDS group 67 and format data 68. The formatted data 68 will be output as serial data 64. Additionally, the receiver software 61 may provide for receiver control 69. After receiving information in the radio receiver 60, the main software 117 may receive certain information.

The main software 117 may allow a user to enter a receiver frequency 118 in a preferred embodiment. Alternately, the software can allow the receiver to search for a frequency. Next, the software allows for the entering of a PI code 119. The PI code 119 may be user programmable or may be preselected. Next, the user will have the ability to enter CAPCODES 120. Based upon the selection of the CAPCODES and the PI code, the main software 117 will filter messages 62, 63 according to the PI code and CAPCODE. Next, the main software will store the messages having PI codes and CAPCODES which match the criteria programmed into the main software. In addition to the PI codes and CAPCODES entered by a user, some PI codes and CAPCODES may also be pre-programmed into the software. Some messages may trigger alarm functions 122 or system control 123 such as turning on a light bulb. Other system control 123 features may also be utilized. In addition to the main software, the user-programmable receiver will also likely have a real time clock 112, a system memory 113, a second microprocessor 114, CAPCODE memory 115 and message memory 116. Furthermore, the receiver 60 is likely to have an LCD display 103 and a keyboard 102.

It is anticipated that a popular instrument for receiving the RBDS broadcast will be regular FM radio receivers provided with additional enhancements. In this fashion, radio receiver owners may not only enjoy regular commercial radio broadcasts, but may simultaneously monitor messages from selected information generators. The enhanced user-programmable radio receiver 60 is equipped to search for and receive the 57 khz RBDS data 65, to decode the RBDS data 66, to filter any messages not belonging to the precoded data from those selected messages 67, and to output that data display on the receiver 68. While it is contemplated that a visual display will be preferred, there is no reason that text to voice software could not be utilized to cause the message to be played over the radio speakers. It is also anticipated that even when the radio is turned off for the usual commercial FM broadcast, the receiver may remain activated for the purpose of receiving RBDS data and filtering and storing these messages. The receiver may also have a message indicator to alert the receiver owner of receipt of an unread message.

A user-programmable receiver in the preferred embodiment has a numeric keypad 102 as well as a liquid crystal display (LCD) 103. Furthermore, the receiver may, or may not, have an entertainment radio 110 having a tuner 107, a speaker 111, a display 108, and an antenna 108 as a part of a composite unit. The unit may also have a volume control 106. The keyboard 102, or other user-interface mechanism, may be utilized to enter information codes, such as PI codes and/or CAPCODES, for selectively choosing which groups a particular person would like to receive messages from. The user-programmable receiver 60 will have a storage memory to store a number of selected messages. A prototype has been built which will store at least 50 user selected messages. In addition to the storage of 50 messages, the presently preferred embodiment also stores 10 demand messages which can be accessed and displayed on display 103 by pushing numbers 0–9 on the keypad 102. The demand messages correspond at least in part to CAPCODES pre-programmed, possibly for local news, local weather, etc. These demand messages are likely to have sponsors where the message is displayed in conjunction with advertising. Furthermore, a group of 10 demand messages are stored that continuously scroll across display 103 together with sponsor's advertisements which are displayed when a user is not actively utilizing the user-programmable receiver 60. These scrolling messages can also be updated through the processing station 30. Furthermore, the time and date can also be displayed in the presently preferred embodiment. The memory storage device 116 of a presently preferred embodiment is 8K and uses a first in, last out storage mechanism such that upon receipt of the first 50 messages, the first message in is discarded. Other and/or additional storage mechanisms could be employed utilizing different storage techniques. Furthermore, a larger memory could be utilized depending on the specific capabilities chosen for a particular receiver.

The keyboard, shown as keypad 102, can also be used to sort through messages. Additionally, specific keyboard functions may be utilized to display certain information. Namely, a particular key, when pressed alone, could be utilized to display particular information such as the local weather forecast with or without a sponsor's advertisement depending upon the advertising system utilized. The keypad 102 utilized is a standard numeric keypad having a 4×4 key arrangement like a touch tone telephone. Other data entry mechanisms can be utilized as well such as a conventional typewriter keyboard, mouse, light pen, touch screen, serial interface or any other data entry mechanism. The receiver 60 can be as simple, or as sophisticated as desired. The receiver may have text to speech conversion capability, alarms 104, and other features. The visual display area may be as simple, or as complicated, as is desired for a particular application. The LCD display 103 utilized in the preferred embodiment supports 80 characters. This has been found satisfactory to display most simple messages. Furthermore, messages could be linked such that more than 80 characters could be utilized. Depending on the sophistication of the software of the receiver, it could be possible to broadcast image and sound which could be displayed on a screen and heard through a speaker. With a highly sophisticated receiver, such data could be broadcast and received.

When using a numeric keypad 102, such as a touch tone telephone keypad, the ten numbers 0–9 may be utilized, as discussed above, to identify a specific item of information such as news, weather, sports or entertainment, or obituaries. Additional ten digit numbers and symbols will be utilized if the receivers are made with memory sufficient to store updated demand message. These items of information could be displayed when the corresponding numbered key is pressed. As a commercial tool, the specific message could be sponsored by a particular business and/or organization. For instance, the message may read: "Today's weather is a hot, sunny day with a high of 80 degrees. This weather forecast is brought to you by the XYZ Company."

Receivers 60 can be configured such that they receive more than one message at a time and the processing station 30 can be configured such that more than one message is sent to the signal generator to be transmitted at a single point in time. Furthermore, certain CAPCODES may correspond to a certain type of group. For instance, CAPCODES having a second digit of zero may be reserved for emergency warning codes.

Other receiver types could also be utilized such as telephones, televisions, computers or any other electrical device. A receiver 60 may be programmed to trigger a sound such as an alarm 104 or even perform a function, or action upon the receipt of a particular message with a system control 123. One such function could be the turning on of a traditional radio to receive a radio transmission from an Emergency Warning System. Another function could be to turn on light bulb 100 utilizing conduit 101. Utilizing a control device via an RS232 interface, the receiver could control devices such as controlling water heaters, security codes, burglar alarms, lights, heaters, door lights, etc. Additionally, a receiver 60 may be programmed for a particular CAPCODE or CAPCODES to activate an alarm when a message is received having that particular CAPCODE.

Turning again to FIG. 1, it will be understood that the customer, or information generator 10 must first acquire appropriate software or utilize software operating over a wide area or global computer network, or to otherwise establish an account with a local system. The customer will be assigned a CAPCODE and information is programmed into the local system about the territory in which the customer's messages are to broadcast. For instance, if the information generator 10 is a local school system, messages concerning school closings would typically only be broadcast in that county. On the other hand if the customer is a national political party, it might wish to broadcast messages statewide or nationally. In the case of such large area broadcasting, the local system may communicate by leased telephone line to a satellite uplink 82 and transmit the message to distance systems equipped with satellite receivers 85 which can retransmit the message. Although it is anticipated that electronic mail or data entry over an internet website will be the most convenient methods for a customer to transmit a message to be broadcast to its local system, it may also be possible to utilize a telephone with touch keypad or voice-to-text features, or even to have operator assistance available for the processing station.

The software required operating at the local system will also likely consist of an administrative module to handle record keeping and billing matters and an encoding module to translate the message to be broadcast into data packets.

Figure 4:
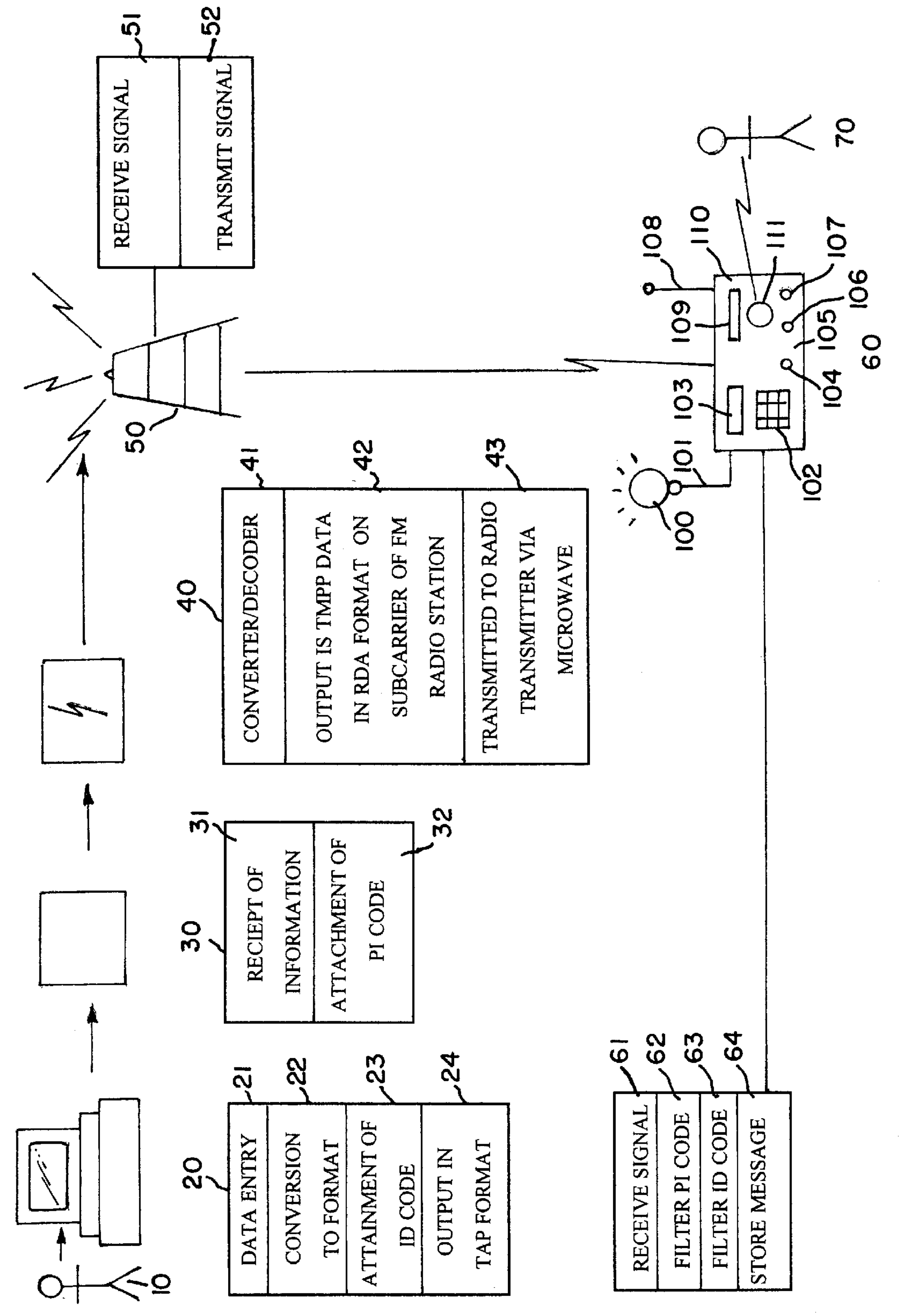
FIG. 4 is a schematic of the system in even more detail illustrating the presently preferred embodiment of the invention.

FIG. 4 shows the presently preferred embodiment of the system. An information generator 10 formulates a message which is sent to a data transmitter 20. The data transmitter 20 allows for data entry 21. The entered data is converted to a format 22 which will be acceptable to a processing station 30. Additionally, the data transmitter 20 attaches an ID code 23. This ID code is the CAPCODE or customer code which identifies a particular sender or a group. The information is output to the processing station 30 in TAP format 24. As the information arrives at the processing station 30, the information is received 31. A PI code which will be used by the receiver to filter out information as attached at the processing center. Next, the message is sent to the signal generator 40 which acts as a converter/encoder 41. The output is TNPP data and RBDS format on a subcarrier of an FM radio station 42. The information is sent from the signal generator 40 by transmission to a radio transmitter via microwave 43. The signal arriving at the radio transmitter is received 51 and transmitted 52. A user-programmable receiver 60 receives the message. The receiver 60 may have a conventional radio 110, an antenna 108, a frequency display 109, a speaker 111, a tuner 107, a volume control adjustment 106, a housing 105, an alarm indicator 104, a keypad 102, and a display 103. The receiver receives a signal 61, filters the PI code 62, filters the identification code, or CAPCODE 63 and, if from a selected group, stores the message 64.

Multipoint messaging is very practical and economical using the same improved method. Not only does it permit a single sender to achieve multipoint message distribution but also permits a single recipient to receive messages from multiple senders or information generators. It is anticipated that the public will be provided access to many CAPCODES for selection and input into their receivers and receiver owners may determine from what information generators they wish to receive messages. An additional benefit of this method permits for the possibility of national, regional, statewide, county, and community emergency notification. If an RBDS receiver were placed in a television for screen display of messages, for instance, pinpoint emergency weather notification information could be distributed. By easily bringing messaging to the community level, it is possible to realize economical, targeted multipoint messaging.

There are enormous commercial and advertising possibilities which may be realized through the present communication system. Fees may be charged for the assignment of CAPCODES to groups and/or senders of information. Sponsorship for certain information such as weather, news, sports, etc. may be sold. Furthermore, advertisements may be sent to units to be displayed when a user is not actively seeking to locate a specific message. Radio stations are provided a commercial use for at least one of their side bands which are now not utilized.

Currently the data transmission rate of 9600 Baud has been achieved. At this rate, the communications system taught herein may deliver approximately 15,000 messages per hour, believed to be equivalent to all the non-personalized mail typically sent to the residents of a town of about 10,000 people. This is achieved utilizing just one PI code and up to 1,000,000 CAPCODES. It is also possible that more than one PI code could be utilized by various receivers. This could make the assignment of CAPCODES and PI codes unique to billions of groups and/or individuals. As technology progresses, it is likely that this information transfer rate will only increase. Furthermore, multiple subcarriers could be utilized. At a rate of approximately 1200 Baud, approximately 20,000 messages are believed to be capable of being sent between the hours of 8:00 a.m. and 6:00 p.m. This communication system may, or may not, need to be as time sensitive as a paging system. Obviously when a page is sent, it is expected that the message will be sent in a relatively short amount of time. On the other hand, some people using this system may not care when during the next few hours, or even days, that the message is sent. Accordingly, different fees could be charged for different lengthy criticalities of sending messages.

People could be charged for sending a particular message. People could be charged a monthly fee for renting a CAPCODE (similar to a fee charged for having a telephone number). CAPCODES could be given to the police authorities or local government agencies which provide emergency data. It is likely that every market would be potentially different in some way. A different marketing/sales plan for the service could be offered according to each market. The current cost of a preferred embodiment of a user-programmable receiver is approximately $90. If put into a large-scale production, it could be possible to get all the electronics onto a single chip and significantly reduce the cost of the receiver.

The system is relatively easy to install. Installation of a signal generator and processing station has been performed in less than three hours. This system may be useful in taking some of the message traffic off of e-mail and freeing up certain long distance lines. Not only is this system a new method of communication, this is also a new method of doing business.

Businesses may buy user-programmable receivers which could have the businesses CAPCODE permanently entered. Accordingly, the user of that receiver would receive all messages sent out having that particular CAPCODE (i.e., a particular receiver would get all the advertisements from the XYZ Corp. if that corresponding CAPCODE was permanently installed).

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those skilled in the art that the present invention is not limited thereto since many modifications can be made. Therefore, it is contemplated that any and all such embodiments are included in the present invention as may fall within the scope or equivalent scope of the appended claims.

We claim:

1. A method of communication comprising the steps of:

(a) an information generator formulates information to be delivered to at least two recipients, said information generator conducts the information to a data transmitting device;

(b) the data transmitting device receives the information and conducts the information to a processing station;

(c) the processing station receives the information and conducts the information containing an identification code to an FM radio transmitter;

(d) the FM radio transmitter receives the information and transmits the information and said the identification code in a subcarrier of a transmission;

(e) a user of a user-programmable FM radio receiver having entered at least one information code directly into the user-programmable FM radio receiver, said user-programmable FM radio receiver configured to process subcarriers of the transmission for transmitted date; and (f) at least two user-programmable receivers receive and decode the transmission in the subcarrier of the transmission, sort the decoded transmission by comparing the at least one information code which has been programmed by users of the user-programmable receivers and any other programmed information code stored in the user programmable receiver with the identification code of the decoded transmission and only if the at least one programmed information code matches the identification code of the decoded transmission, then decoding a remaining portion of the transmission and utilizing at least a portion of the information provided by the information generator.

2. The method of claim 1 wherein the utilization of at least a portion of the decoded transmission comprises displaying said at least a portion of said decoded transmission.

3. The method of claim 1 wherein the data transmitting device transmits data in TAP protocol.

4. The method of claim 1 wherein the data transmitting device assigns the information code to the information which is conducted along with the information to the processing station.

5. The method of claim 1 wherein a second information code is assigned at the processing station along with the information code to the information prior to conducting the information along with the information code and the second information code to the FM radio transmitter for transmission on the subcarrier.

6. The method of claim 4 wherein a second information code is assigned at the processing station to the information prior to conducting the information along with the information code and the second information code to the FM radio transmitter for transmission on the subcarrier.

7. The method of claim 5 wherein the processing station assigns a PI code to the information prior to conducting information to a radio transmitter.

8. The method of claim 4 wherein the data transmitting device assigns a CAPCODE to the information.

9. The method of claim 1 wherein the processing station assigns a first information code to the information which is conducted along with the information to the radio transmitter.

10. The method according to claim 9 wherein the processing station assigns a CAPCODE to the information.

11. The method of claim 1 wherein a signal generator receives information from the processing station and conducts information to the radio transmitter.

12. The method of claim 11 wherein the signal generator encodes the information on a subcarrier of a FM band.

13. The method of claim 1 wherein the user-programmable receiver further comprises an LCD display.

14. The method of claim 1 wherein the user-programmable receiver further comprises a keypad.

15. The method of claim 1 wherein the data transmitting device also conducts information to a wide area network which is connected to a second data transmitting device; the second data transmitting device receives the information and conducts the information to a radio transmitter; and the second radio transmitter receives the information and transmits the information.

16. The method of claim 15 wherein a satellite uplink receives the information and transmits the information to any of a second data transmitting device, a second processing station, or a second radio transmitter.

17. The method of claim 1 wherein the user-programmable receiver searches for an FM signal, decodes RBDS data, filters RBDS groups, formats data and outputs data.

18. The method of claim 1 wherein the user-programmable receiver receives a PI code entered by a user.

19. The method of claim 1 wherein a portion of the decoded transmission triggers an alarm function.

20. The method of claim 1 wherein a portion of the decoded message controls a system function.

21. The method of claim 1, wherein the information received by the radio transmitter from the signal generator is formatted as TNPP data in RBDS format on a subcarrier of an FM radio station.

22. The method of claim 1 wherein the identification code of a decoded transmission is compared with at least two information codes directly programmed by the user of the user-programmable receiver.

23. The method of claim 2 wherein the portion of the decoded message displayed by the user-programmable receiver is stored.

24. The method of claim 1 wherein the portion of the decoded message utilized is stored.

25. A system of communication comprising:

(a) an information generator which generates an information message;

(b) a data transmitting device which receives the message from the information generator;

(c) a processing station which receives the message from the data transmitting device;

(d) an FM transmitter which receives the message from the processing station and transmits the message in a transmission on a subcarrier of a frequency modulated radio band;

(e) a user programmable receiver having a display and an FM tuner, said receiver capable of receiving an information code directly input from a user for comparison with transmissions, receiving the transmission from the FM transmitter, decoding the information code of the transmission off the subcarrier of the transmission, filtering the decoded transmission by comparing the information code which has been directly input by user of the user-programmable receiver into the receiver any other programmed information code in the receiver with an identification code of the decoded transmission and if a programmed information code matches the identification code of the decoded message, decoding the information message and displaying at least a portion of the decoded transmission on the display.

26. The method of claim 25 wherein the user-programmable receiver further comprises a microprocessor and a 57 Khz demodulator.

27. The method of claim 25 wherein the user-programmable receiver further comprises a real time clock, a microprocessor and memory.

28. The method of claim 25 wherein the user-programmable receiver further comprises an LCD display and a keypad.

29. A method of point to multipoint communication in a system having a data transmitting device, a processing station, and a user-programmable receiver comprising the steps of:

(a) communicating an information code to at least one user;

(b) the at least one user directly enters an information code in the user-programmable receiver through an input of the user-programmable receiver, said receiver having an FM tuner and a processor adapted to analyze subcarriers of a particular FM broadcast;

(c) an information generator formulates information to be delivered to said at least one user, that information generator conducts the information to the data transmitting device;

(d) the data transmitting device receives information and conducts information to a processing station;

(e) the processing station receives the information and conducts the information containing at least one identification code to an FM radio transmitter;

(f) the FM radio transmitter receives the information and transmits the information containing the code in a subcarrier of a transmission; and (g) the programmable receiver receives the transmission with the information on the subcarrier, decodes the identification code provided in the subcarrier of the transmission, filters the decoded transmission by comparing the information code entered by the user of the user-programmable receiver and all other programmed information codes with the identification code of the decoded transmission and if any of the programmed information codes match the identification code of decoded transmission, storing at least a portion of decoded transmission containing the information provided by the information generator, but if no match occurs, not storing any of the decoded transmission.

30. A user-programmable receiver comprising:

(a) a display;

(b) a user-interface mechanism capable of directly entering at least one information code;

(c) a receiving portion having an FM tuner; and (d) a storage memory and a microprocessor; whereby said receiving portion is capable of receiving a transmission through the FM tuner, and said microprocessor decoding the identification code of the transmission from a subcarrier of an FM band, filtering the decoded transmission by comparing any user-programmed information code and any other programmed information code with the identification code of the decoded transmission; and if a programmed information code matches the identification code of the decoded transmission, storing at least a portion of the decoded message in the storage memory.

31. The system of claim 25 further comprising the step of storing said at least a portion of the decoded transmission.

32. A system of claim 25 wherein the user programmable receiver further comprises pre-programmed information codes.

33. The system of claim 32 wherein the pre-programmed information codes are permanently stored in a portion of said user programmable receiver.

34. The system of claim 25 wherein at least one of the pre-programmed information codes corresponds to an advertisement-type message, said advertisement-type message being periodically displayed on a display.

35. A system of claim 25 wherein the user programmable receiver further comprising a user-interface mechanism whereby the user-interface mechanism may be utilized to obtain messages having pre-programmed information codes.

36. A system of claim 35 wherein at least two messages are displayed at periodic intervals.

37. The system of claim 36 wherein the messages contain advertising information.

38. The user-programmable receiver of claim 33 further comprising a second frequency modulator receiver capable of tuning into a local frequency modulated radio station for entertainment purposes.

39. A system of claim 25 wherein the user-programmable receiver further comprises a decryption device decrypts a portion of the transmission.

40. A system of claim 25 wherein information generators are charged a fee for each information message sent to the data transmitting device.

41. The method of claim 8 wherein a fee is charged to an entity for use of the CAPCODE.

42. The method of claim 41 wherein the fee is charged periodically.

* * * * *